S. T. LAMB.
Nut-Locks.

No. 147,273. Patented Feb. 10, 1874.

Witnesses.

Inventor.
Salem T. Lamb.
By Atty. A. B. Stoughton.

UNITED STATES PATENT OFFICE.

SALEM T. LAMB, OF NEW ALBANY, INDIANA.

IMPROVEMENT IN NUT-LOCKS.

Specification forming part of Letters Patent No. 147,273, dated February 10, 1874; application filed January 12, 1874.

*To all whom it may concern:*

Be it known that I, SALEM T. LAMB, of New Albany, in the county of Floyd and State of Indiana, have invented certain New and useful Improvements in Nut-Locks and Washers; and that the following is a full, clear, and exact description of the same, reference being had to the accompanying drawings making a part of this specification, in which—

Figure 1:
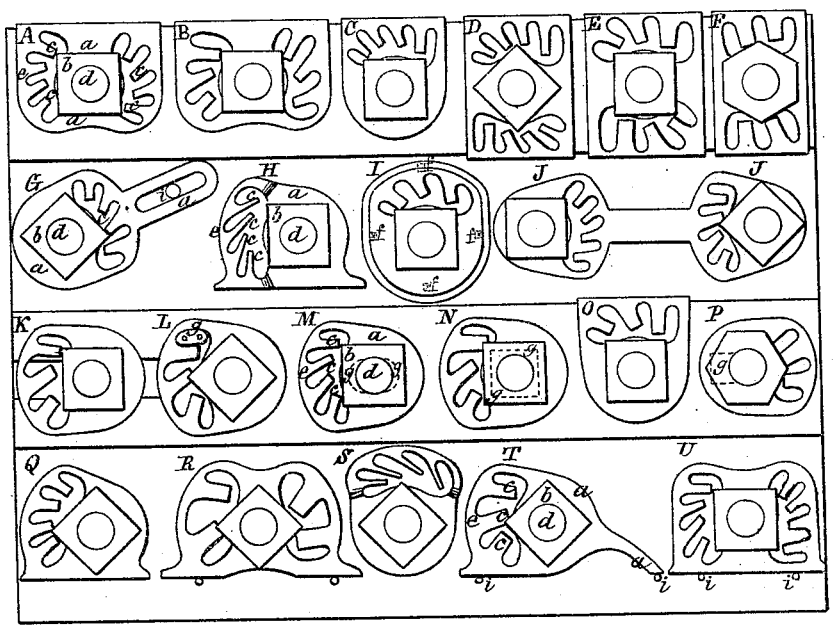
Figure 2:
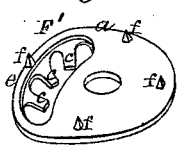
Figure 3:
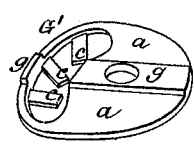

Figure 1 represents the nut-locks and washers in their several modified forms and adaptability to such purposes as require or employ screw-bolts, but all having the same general characteristics. Figs. 2 and 3 represent, in perspective, views of the lock-plates or washers, as seen from their under sides.

My invention consists in combining with a bolt and nut a lock-plate washer having a series of detached lugs or fingers connected to an external rim and projecting therefrom toward the nut in directions eccentric to the central axis of the nut, and which fingers are bent upward or sidewise to catch and hold the nut when run onto its place and bearing.

To enable others skilled in the art to make and use my invention, I will proceed to describe the same with reference to the drawings.

In the drawing, Fig. 1, from A to U inclusive, the lock-plate washer $a$ is shown as made with a series of lugs or fingers, $c$, separated from each other, but attached to an external rim, $e$, and projecting therefrom toward the nut $b$, in directions eccentric, or other than radial, to the center of the nut which is run onto the screw-bolt $d$. The only difference between these several forms or shapes of so projecting lugs or fingers $c$ is in the number of locks that can be made in every turn, or fractional turn, of the nut. In the form shown at A one of the fingers $c$ will be in position to lock the nut $b$ at every thirty-second of a turn of said nut. Those at B will lock their nut at every twenty-fourth part of a full turn. Those at C D G H J M Q R S U will be in position to lock their nut at every sixteenth of a turn, and those at E F I K L N O P T will be in position to lock their nut at every one-twelfth of a full turn. Thus, in all these cases, the nut can be locked at almost the exact position where it comes tight up against the wood, plate, or washer with which it is used. In the forms shown at D E F U the locks are double—that is, so that two of the fingers may be bent up and hold the nut on opposite sides of it.

When the lock-plates are used against wood, spurs $ff$, as in Fig. 2 and as at I in Fig. 1, are cast or wrought upon them to take into the wood and prevent said plate from turning. When used with metal, then a projection or rib, $g$, as in Fig. 3 and as in dotted lines at M N P, is cast or wrought upon said plate, which will fit into a recess, in the metal—as, for instance, in a rail or fish-piece, and so prevent it from turning; or, when used with wood, pins $i$, as at G T U, may be used to prevent the lock-plate from turning.

At L, the projection $g$ is represented as riveted to the under plate and extending into an opening in the lock-plate.

Many ways of holding the lock-plate may be devised, but this constitutes no part of my claim or invention.

At H and S, the rim and fingers attached are represented as slightly raised above the body $a$ of the lock-washer. In these cases the fingers are bent sidewise to catch the nut. In all the other cases they are bent upward for the same purpose.

The fingers at H S stand in greater obliquity in relation to their nut than in the other modifications.

I propose to make these lock-washers of malleable cast-iron, as being cheaper, and as capable of withstanding the extent of bending that the fingers undergo, which is very minute, as wrought metal, but they may, many of them, be punched or struck out of wrought metal. The separating of the fingers from contact with each other admits of the casting of the lock-plates. They could not be cast if the fingers were contiguous.

Having thus fully described my invention, what I claim therein as new, and desire to secure by Letters Patent, is—

In combination with a bolt and nut, a lock-plate washer, $a$, having an external rim, $e$, and a series of fingers, $c$, attached thereto and projecting therefrom toward the nut in a direction oblique to the center of the nut, as and for the purpose described and represented.

SALEM T. LAMB.

Witnesses:
A. B. STOUGHTON,
EDMUND MASSON.